United States Patent [19]

Ogano et al.

[11] Patent Number: 4,694,942
[45] Date of Patent: Sep. 22, 1987

[54] INTERLINKING CONTROL DEVICE FOR BRAKE AND CLUTCH IN TRACTOR-MOUNTED WORKING MACHINES

[75] Inventors: Takeo Ogano; Takeshi Komatsuzaki; Ryoichi Shigenari, all of Saitama; Naomoto Uesugi, Tokyo, all of Japan

[73] Assignee: Honda Giken Kogyo Kabushiki Kaisha, Tokyo, Japan

[21] Appl. No.: 702,208

[22] Filed: Feb. 15, 1985

[30] Foreign Application Priority Data

Feb. 17, 1984 [JP] Japan ................................. 59-29210
Feb. 17, 1984 [JP] Japan ................................. 59-29213

[51] Int. Cl.⁴ ...................... F16D 41/24; G05G 9/08
[52] U.S. Cl. ............................. 192/13 A; 192/13 R; 192/99 S; 74/47 B; 74/480 R; 56/11.3
[58] Field of Search ................. 192/13 A, 13 R, 15, 192/99 S, 17 R, 3.62, 11; 74/474, 480 R, 478; 56/11.3, 11.6, DIG. 6

[56] References Cited

U.S. PATENT DOCUMENTS

| 2,080,196 | 5/1937 | Bowen | 192/13 R |
| 3,498,433 | 3/1970 | Lohmann | 192/99 S |
| 4,014,419 | 3/1977 | McKnight | 192/13 R |
| 4,248,331 | 2/1981 | Behrens | 192/13 R |
| 4,310,082 | 1/1982 | Elmy et al. | 192/11 |
| 4,408,683 | 10/1983 | Elmy et al. | 56/11.3 X |
| 4,441,596 | 4/1984 | Nakahara et al. | 192/13 R |
| 4,496,035 | 1/1985 | Wanie | 74/474 |

FOREIGN PATENT DOCUMENTS

| 639977 | 3/1928 | France | 74/480 R |
| 1577190 | 8/1969 | France | . |
| 2485998 | 1/1982 | France | . |
| 10085 | 4/1972 | Japan | . |
| 288693 | 4/1928 | United Kingdom | . |
| 991072 | 5/1965 | United Kingdom | . |
| 1159257 | 7/1969 | United Kingdom | . |

Primary Examiner—Rodney H. Bonck
Assistant Examiner—David A. Testardi
Attorney, Agent, or Firm—Armstrong, Nikaido, Marmelstein & Kubovcik

[57] ABSTRACT

An interlinking control device in a tractor-mounted working machine having an engine with a governor, a braking mechanism for braking wheels, and a clutch operatively coupled between the engine and the wheels. The braking mechanism and the clutch are operated respectively by first and second control systems, which have ends coupled to a single human-operated swingable member. The clutch starts being disengaged when the swingable member starts swinging and is completely disengaged when the swingable member is positioned intermediately on a path of swingng movement thereof. The braking mechanism produces a maximum braking force when the swingable member reaches a terminal end of the path of swinging movement thereof.

4 Claims, 15 Drawing Figures

INTERLINKING CONTROL DEVICE FOR BRAKE AND CLUTCH IN TRACTOR-MOUNTED WORKING MACHINES

BACKGROUND OF THE INVENTION

1. Field of the invention:

The present invention relates to an interlinking control device for operating a brake and a clutch with a single pedal in a tractor-mounted working machine on which an engine with a governor is mounted.

2. Description of the Prior Art:

Tractor-mounted working machines having various working units such as lawn mowers, cultivators, snowplows, for example, generally employ a single engine for driving both drive wheels and the working unit. In order to permit the working unit to perform its intended operation reliably, the engine is equipped with a governor for controlling the engine to rotate at a constant speed against load variations. The engine with the governor produces a drive force even when the tractor is braked since the braking force is regarded as a load by the governor. Therefore, the tractor cannot be stopped until the braking force exceeds the output power of the engine at a predetermined speed of rotation of the engine.

In general, the tractor-mounted working machines of the type described above include a brake control system and a clutch control system which are operatively interconnected by a single pedal for operating the brake and the clutch in interlinked relation. As shown in Japanese Utility Model Publication No. 47-10085 published on Apr. 15, 1972, one such a brake and clutch interlinking arrangement is designed such that, when the pedal is depressed, the clutch is first disconnected and then the brake is actuated. When the tractor is braked after the clutch has been disengaged, the tractor tends to be braked abruptly because the braking force sharply increases in a short pedal stroke near the end of the entire depression stroke of the pedal. In case the tractor is to be stopped on an uphill road, the tractor may back off before the brake develops a sufficient braking force. Another problem is that when the pedal is released to start the tractor after it has been braked by the pedal, the clutch is then engaged with no braking force on the tractor, causing the tractor to start suddenly and quickly.

SUMMARY OF THE INVENTION

With the foregoing problems in view, it is an object of the present invention to provide an interlinking control device for a brake and a clutch in a tractor-mounted working machine, the interlinking control device being capable of braking and starting the tractor smoothly while preventing sudden and quick braking and starting thereof.

Another object of the present invention is to provide an interlinking control device for a brake and a clutch in a tractor-mounted working machine, which device allows a long pedal stroke for easy operation thereof.

According to the present invention, there is provided an interlinking control device in a tractor-mounted working machine having an engine with a governor, wheels, a braking mechanism for braking the wheels, and a clutch for selectively transmitting power from the engine to the wheels, the interlinking control device comprising a first control system for operating the braking mechanism, a second control system for operating the clutch, and a single human-operated swingable member coupled to ends of the first and second control systems, the arrangement being such that the clutch starts being disengaged when the swingable member starts swinging and is completely disengaged when the swingable member is positioned intermediately on a path of swinging movement thereof, and the braking mechanism produces a maximum braking force when the swingable member reaches a terminal end of the path of swinging movement thereof.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
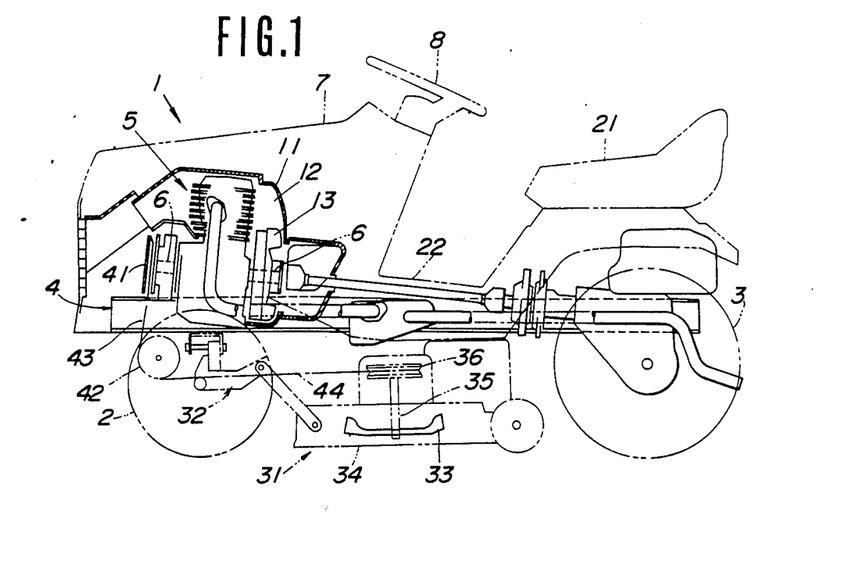
FIG. 1 is a tractor-mounted lawn mower incorporating therein an intelinking control device for a brake and a clutch according to the present invention.
Figure 2:
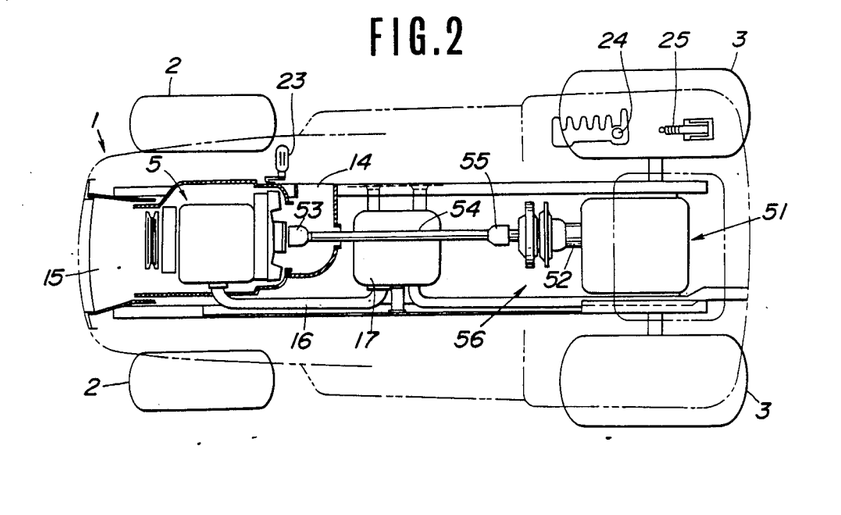
FIG. 2 is a plan view of the tractor-mounted lawn mower shown in FIG. 1.

As illustrated in FIGS. 1 and 2, a tractor-mounted lawn mower 1 has a tractor frame 4 supported by two front wheels 2, 2 and two rear wheels 3, 3, and an engine 5 having a governor and an output shaft 6 with ends projecting forwardly and rearwardly therefrom.

The engine 5 is covered with an engine cover 7 attached to a front portion of the tractor frame 4. The two front wheels 2, 2 can be steered by a steering wheel 8 disposed behind the engine cover 7.

The illustrated engine 5 is an air-cooled engine placed in a cooling air passage 12 defined by a shroud 11. A fan 13 attached to the rear end of the output shaft 6 of the engine 5 operates to introduce air through an opening 14 which opens in one side of the tractor. The introduced air passes through the passage 12 to cool the engine 5, and then is discharged out through an opening 15 which opens in a front end of the tractor. An exhaust pipe 16 extends rearwardly from the engine 5 and includes an intermediate muffler 17.

A driver's seat 21 is mounted on a rear portion of the tractor frame 4. A brake pedal 23 doubling as a clutch pedal is positioned on a floor 22 below the steering wheel 8. A gear transmission shift lever 24 and a parking brake lever 25 are disposed on one side of the seat 21.

A lawn mower 31 is suspended from the tractor frame 4 in a position between the front and rear wheels 2, 3. The lawn mower 31 is coupled to a vertical position adjusting mechanism 32 for adjusting the vertical position of the lawn mower 31 to vary the height of grass to be cut off.

The lawn mower 31 is composed of cutter blades 33 and a housing 34 accommodating the cutter blades 33 therein. The cutter blades 33 are supported on a shaft 35 with a pulley mounted on an end thereof. A pulley 41 mounted on the front end of the output shaft 6 is operatively coupled to the pulley 36 by belts 43, 44 through an intermediate pulley 42 for rotating the cutter blades 33 at a constant engine speed controlled by the governer.

A gear transmission 51 is disposed below the seat 21 in a position between the rear wheels 3, 3 and has an input shaft 52. The rear end of the output shaft 6 of the engine is operatively coupled to the input shaft 52 of the gear transmission 51 through a joint 53, a drive shaft 54, a joint 5, and a clutch 56. The clutch 56 serves to selectively transmits engine power to the rear wheels 3, 3.

Operative connections and operation of the brake pedal 23, the gear transmission shift lever 24, and the parking brake lever 25 will be described with reference to FIG. 3.

The gear transmission shift lever 24 is swingable about two pivot shafts 61, 62 in two directions perpendicular to each other. The swinging movement of the shift lever 24 about the pivot shaft 61 is transmitted through a change rod 63, a change arm 64, and a shifter to the gears in the gear transmission 51. In the illustrated embodiment, five forward gear positions $F_1$, $F_2$, $F_3$, $F_4$, $F_5$ and a reverse gear position $R_1$ can be selected dependent on angles of swinging movement of the shift lever 24 about the pivot shaft 61. A panel 65 through which the shift lever 24 extends has a shift pattern 66 including a guide slot 67 extending in a direction normal to the pivot shaft 61 and a plurality of engagement slots 68 extending parallel to the pivot shaft 61 and corresponding respectively to the angles of swinging movement of the shift lever 24. One of the engagement slots 67 provides a neutral position N.

A shaft 72 is supported on a bracket 71 above the pivot shaft 62 in parallel relation thereto. A bow-shaped arm 74 has opposite ends rotatably mounted on the shaft 72, the bow-shaped arm 74 being normally held in contact with a roller 73 mounted on an intermediate portion of the shift lever 24.

To one of the ends, denoted 74a of the arm 74, there is attached an end of a clutch wire 76 having a lost-motion mechanism 75. A counter spring 83 is connected between a support member 81 fixed to the end 74a of the arm 74 and a support member 82 fixed to the shaft 72. A bracket 84 and a damper arm 85 are mounted on an intermediate portion of the shaft 72 for rotation therewith. The clutch wire 76 is coupled to the brake pedal 23.

The bracket 84 is connected to a rod 87 coupled to an actuation lever 86 of the clutch 56. The damper arm 85 is attached at one end thereof to a single-acting damper 91 which imposes resistance to its extending movement only. The single-acting damper 91 includes an attachment end attached to the tractor frame 4 and having an oblong hole 93 through which an attachment pin 92 is inserted.

The clutch actuation lever 86 is coupled to a return spring the resiliency of which acts on the arm 74 through the rod 87, the bracket 84, the shaft 72, the support member 82, the counter spring 83, and the support member 81 for normally urging the arm 74 in a direction to be resiliently held against the roller 73.

Figure 3:
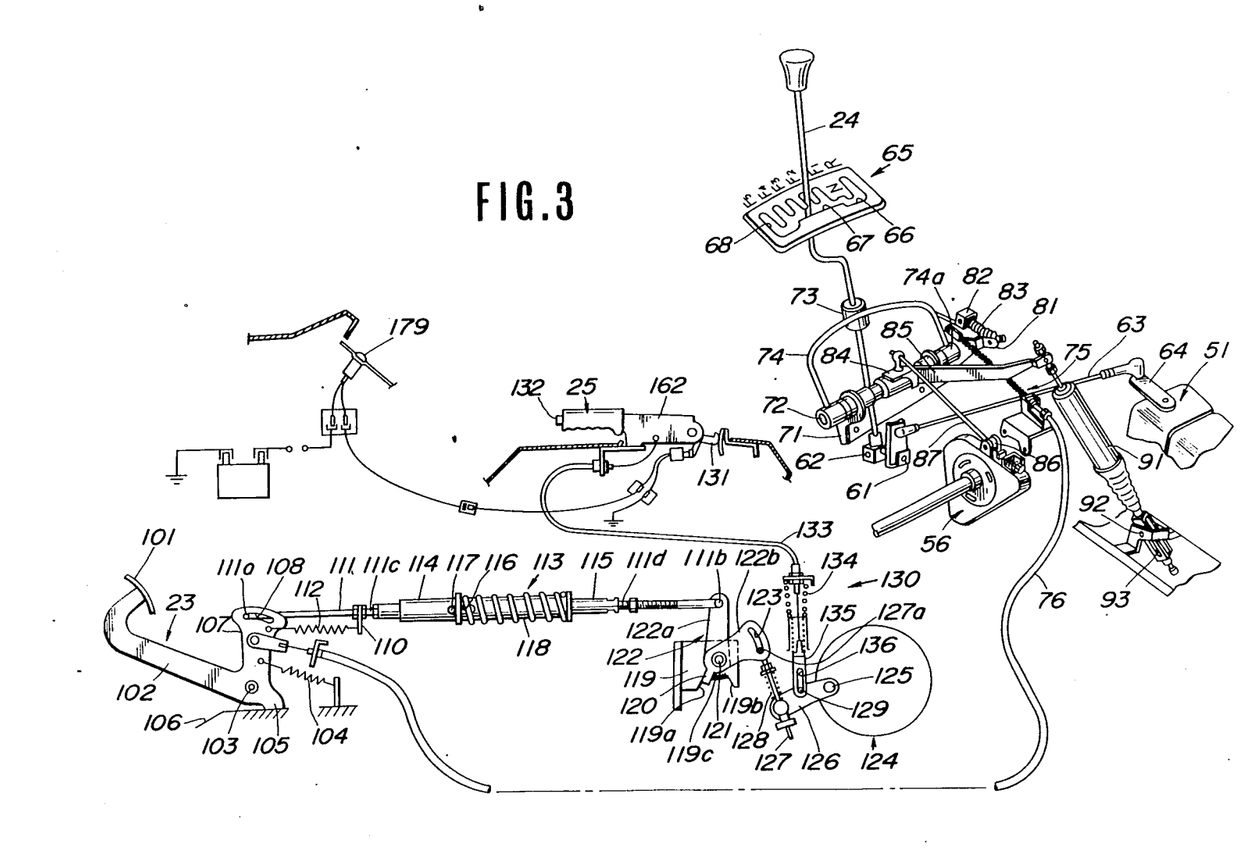
FIG. 3 is a fragmentary side elevational view, partly shown in perspective, showing operative connections of a brake pedal, a gear transmission shift lever, and a parking brake lever in the tractor-mounted lawn mower.

When the shift lever 24 is shifted from the guide slot 67 into the engagement slot 68 for the gear position $F_2$, for example, as shown in FIG. 3, the arm 74 is tilted back leftwardly in following relation to the roller 73. Such a tilting movement of the arm 74 is transmitted via the counter spring 83, the support member 82, and the shaft 72 to the bracket 84 and the damper arm 85. The clutch 56 is then engaged by the rod 87, whereas the attachment pin 92 is positioned at the lower end of the oblong hole 93 to extend the damper 91. While the attachment pin 92 slides in the oblong hole 93 with the swinging movement of the damper arm 85, the damper 91 remains inoperative. From the time when the attachment pin 92 has reached the lower end of the oblong hole 93, the damper 91 is gradually extended while dampening its extending movement, thus gradually engaging the clutch 56. The damper 91 will operate in the same way as described above if the the shift lever 24 is shifted into the engagement slot 68 while the brake pedal 23 is being depressed, and then the brake pedal 23 is released.

When only the shift lever 24 is operated, any displacement of the clutch wire 76 due to the tilted movement of the arm 74 is taken up by the lost-motion mechanism 75. Therefore, the brake pedal 23 will not be moved by the operation of the shift lever 24.

When the shift lever 24 is shifted from any of the engagement slots 68 into the guide slot 67, the arm 74 is tilted rightwardly toward the viewer of FIG. 3 by the roller 73. The tilting movement of the arm 74 is transmitted to the bracket 84 and the damper arm 85. The clutch 56 is disengaged by the rod 87, and the damper 91 is contracted with the attachment pin 92 positioned at the upper end of the oblong hole 93. At this time, any difference between the stroke of the shift lever 24 in any of the engagement slots 68 and the stroke of the actuation lever 86 of the clutch 56 is taken up by the counter spring 83. The clutch 56 can be disengaged or the damper 91 can be contracted by depressing the brake pedal 23, independently of the shifting movement of the shift lever 24 into the guide slot 67. Upon shifting the shift lever 24 from any engagement slot 68 into the guide slot 67, the arm 74 is tilted to displace the clutch wire 76. However, such displacement of the clutch wire 76 is taken up by the lost-motion mechanism 75. Consequently, the brake pedal 23 will not be moved by the operation of the shift lever 24. Since the arm 74 is moved out of contact with the roller 73 by depressing the brake pedal 23, the shift lever 24 is not moved by depressing the brake pedal 23.

The brake pedal 23 includes an arm 102 having a treadle 101, the arm 102 being pivotally mounted by a pivot shaft 103 to the tractor frame 4. The treadle 101 is normally urged upwardly by a return spring 104. The brake pedal 23 is angularly movable between an upper limit defined by a return stopper 105 and a lower limit defined by a stopper 106 on the floor 22.

Another arm 107 extends from the pivoted end of the brake pedal 23 in angularly spaced relation to the arm 102. The arm 107 has an arcuate slot 108 defined in a distal end thereof about the pivot shaft 103. The arm 107 is attached at an intermediate portion thereof to one end of the clutch wire 76.

A brake rod 111 has one end 111a inserted in the slot 108. The rod end 111a is normally urged to be held against a front end of the slot 108 by a spring 112 acting between a bracket 110 secured to the brake rod 111 and the arm 107. The brake rod 111 includes in its intermediate portion a turnbuckle 113 adjustable in length and having an operating force limiting and transmitting mechanism, described later on.

The brake rod 111 has an opposite end 111b connected to a first arm 122a of a bell crank 122 pivotally mounted on a support plate 119 by a pivot shaft 121. The bell crank 122 has a second arm 122b in which there is defined an arcuate slot 123 extending about the pivot shaft 121.

The bell crank 122 has on its pivoted end an integral rectangular indicator 120 extending in a direction substantially diametrically opposite to the first and second arms 122a, 122b across the pivot shaft 121. The indicator 120 is engageable with angularly spaced locking portions 119a, 119b on the support plate 119 for limiting an angular interval through which the bell crank 122 is angularly movable about the pivot shaft 121. The support plate 119 has graduations 119c marked along the path of angular displacement of the indicator 120. The graduations 119c are provided to indicate degress of wear of a brake shoe, and at least include an indicia representing the limit beyond which the brake shoe should not be worn, i.e., the limit at which the worn brake shoe sould be replaced with a new one. Thus, the indicator 120 serves as a wear indicator for pointing one of the graduations 119c upon angular movement of the bell crank 122.

Figure 4:
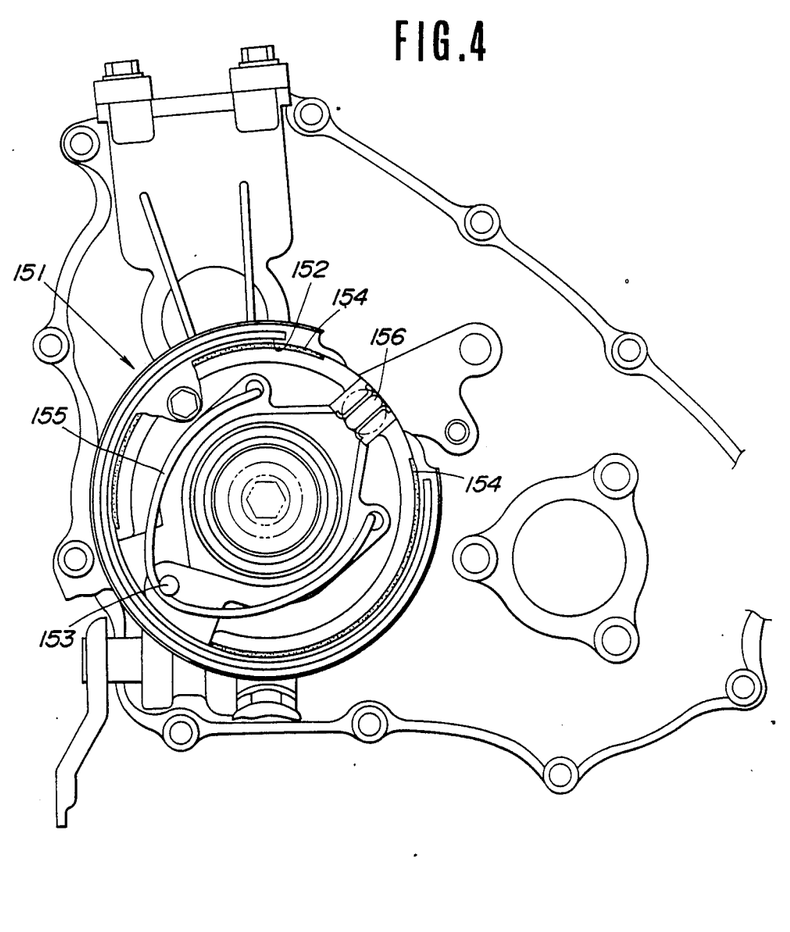
FIG. 4 is a side elevational view, partly broken away, of a braking mechanism.

A braking mechanism 124 for the rear wheels 3 includes a brake arm 126 angularly movable about a pivot shaft 125 and having a distal end attached to a rod 127. The rod 127 has a distal end 127a inserted in the arcuate slot 123 in the second arm 122b of the bell crank 122. The rod 127 is normally urged by a spring 128 in a direction to hold the distal end of the rod 127 in abutment against the end of the slot 123 closer to the brake arm 126. The brake arm 126 has a pin 129 mounted on an intermediate portion thereof. As shown in FIG. 4, the braking mechanism 124 comprises a drum brake composed of a brake drum 152, an anchor pin 153, brake shoes 154, 154, a return spring 155, and a cam 156 for spreading apart the brake shoes 154, 154. The cam 156 is integral with the pivot shaft 125 on the brake arm 126, and hence is angularly movable in response to angular movement of the brake arm 126. The slot 123 in the bell crank 122 is effective in preventing the brake pedal 23 from being moved when the parking brake lever 25 is pulled.

Figure 5:
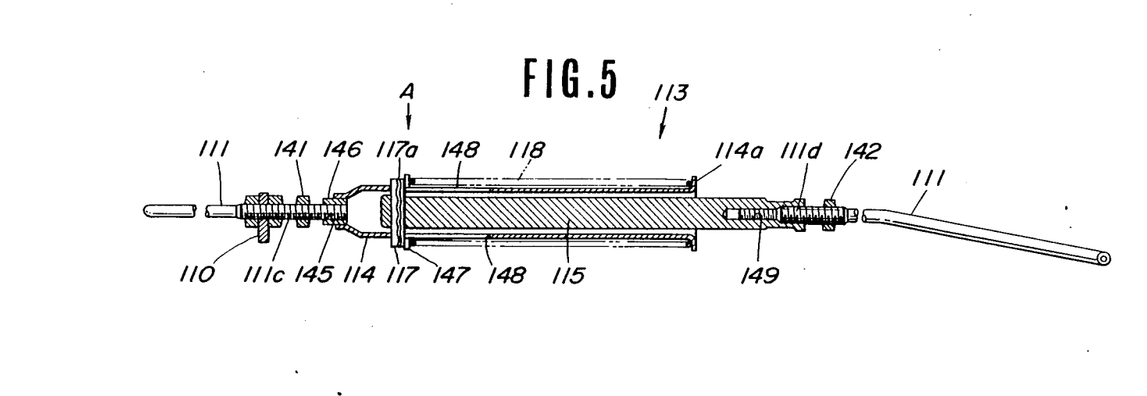
FIG. 5 is a cross-sectional view of a turnbuckle.
Figure 6:
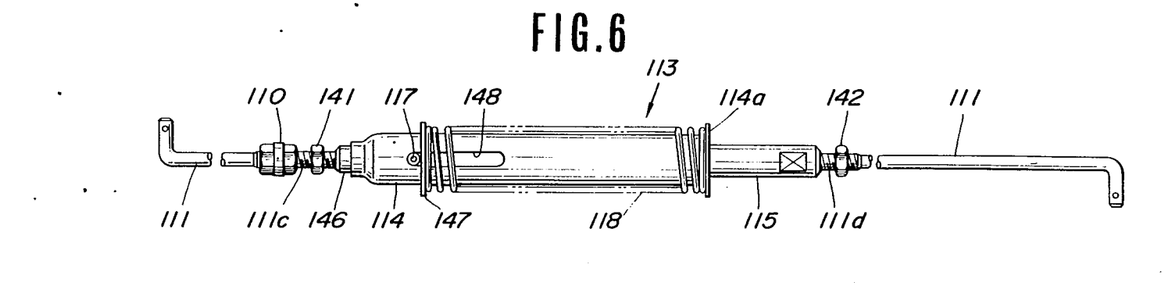
FIG. 6 is an elevational view of the turnbuckle as seen in the direction of the arrow A in FIG. 5.

The construction of the turnbuckle 113 will be described with reference to FIGS. 5 and 6.

The turnbuckle 113 primarily comprises a tubular body 114, a shaft 115, a pin 117, and a spring 118. The tubular body 114 has a front end portion closed by a boss 146 having an internally threaded hole 145. The rear end portion of the tubular body 114 has a radially outward flange 114a. The brake rod 111 has an externally threaded portion 111c threaded in the threaded hole 145 in the boss 146. The tubular body 114 has a pair of diemetrically opposite oblong holes 148, 148 extending in the longitudinal direction of the tubular body 114. The shaft 115 is inserted in the tubular body 114 with a clearance therebetween. The shaft 115 includes a rear end portion having an internally threaded hole 149 with its threads cut in a direction opposite to that of the threads of the threaded hole 145 in the boss 146. For example, the threads of the threaded hole 145 may be right-hand threads and the threads of the threaded hole 149 may be left-hand threads, or vice versa. The brake rod 111 also includes an externally threaded portion 111d threaded in the threaded hole 149. The shaft 115 has a radially through hole defined in a front end portion thereof, the pin 117 being force-fitted in the radially through hole and having opposite ends projecting out of the oblong holes 148, 148 in the tubular body 114.

The pin 117 which is cylindrical in shape has a wavy or meandering slit 117 extending in the longitudinal direction thereof. When the pin 117 is force-fitted into the radially through hole in the shaft 115, the slit 117a is closed to facilitate the insertion of the pin 117. After the pin 117 has been inserted, the slit 117a is spread under the resiliency of the pin 117 itself to retain the pin 117 firmly in the shaft 115.

The spring 118 is disposed under compression between the flange 114a of the tubular body 114 and the pin 117 with a washer 147 interposed between the pin 117 and the spring 118. Designated at 141, 142 are lock nuts.

When the tubular body 114 and the shaft 115 are rotated about their own axes in opposite directions, the threaded portions 111c, 111d of the brake rod 111 are axially moved either toward or away from each other since the threads of the threaded hole 145 and those of the threaded hole 149 are oppositely directed. The overall length of the brake rod 111 is thus adjusted. The oblong holes 148 in the tubular body 114, the pin 117 on the shaft 115, and the spring 118 acting between the tubular body 114 and the pin 117 jointly constitute an operating force limiting and transmitting mechanism. The turnbuckle 113 can therefore be moved axially as a whole unless the brake rod 111 is pulled under a force greater than the resilient force of the spring 118. When the brake rod 111 is pulled under a force greater than the resilient force of the spring 118, the spring 118 is compressed and only the tubular body 114 is axially moved in a direction away from the shaft 115. At the time of assembling the brake rod 111, the tubular body 114 and the shaft 115 are adjustably rotated about their own axes for relative movement so that the resilient force of the spring 118 and the force with which the brake rod 111 is pulled will be counterbalanced, i.e., the tubular body 114 starts moving away from the shaft 115, in a position of the pedal 23 which is slightly spaced from the lowermost limit position of the fully depressed pedal 23. At the same time, the tubular body 114 and the shaft 115 are also adjusted so that the pin 117 on the shaft 115 will be positioned intermediate between the ends of the oblong holes 148 in the tubular body 114 when the pedal 23 has reached its lowermost limit position. Therefore, the control or operating force acting on the braking mechanism 124 at the time the pedal 23 is in the vicinity of its lowermost limit position is absorbed as the spring 118 is compressed, and the produced braking force is limited to a force proportional to the reactive force of the compressed spring 118. For this reason, the brake shoes 154, 154 are prevented from being excessively worn, and the various components of the foot brake control system are prevented from being subjected to an excessive load.

The parking brake lever 25 is coupled by a cable 133 through an operating force limiting and transmitting unit 130 to the brake arm 126.

Figure 7:
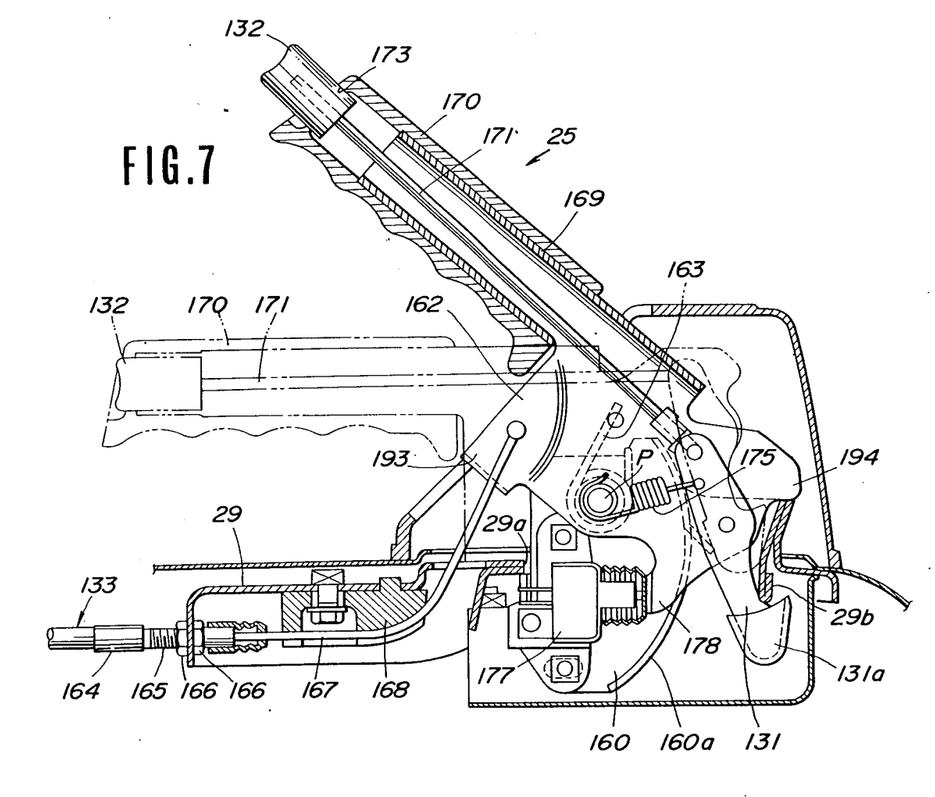
FIG. 7 is a cross-sectional view of a parking brake.

As illustrated in FIG. 7, a base plate 29 which is part of the tractor frame has an opening 29a in which a vertical bracket 160 is mounted, the bracket 160 having a rear edge shaped as an arcuate guide 160a. A locking portion 29b is disposed in a rear portion of the opening 29a. The parking brake lever 25 has a proximal portion 162 pivotally mounted by a pivot shaft P on the bracket 160, and is normally urged to turn counterclockwise (FIG. 7) toward the horizontal position indicated by the two-dot-and-dash lines in FIG. 7. The base plate 29 has a front end wall in which an externally threaded end 165 of an outer member or sheath 164 of a brake cable 133 is inserted and fixed by nuts 166. The brake cable 133 has an inner member 167 inserted through the outer member 164, the inner member 167 passing through a guide 168 secured to the base plate 29 and having an end fastened to the proximal portion 162 of the parking brake lever 25 at a position forward of the pivot shaft P.

The parking brake lever 25 includes a tubular arm 169 surrounded by a grip 170. A push rod 171 extending through the tubular arm 169 supports on its distal end a push button 132 partly disposed in a front opening defined in the grip 170. A lock lever 131 is pivotally mounted on the proximal portion 162 of the parking brake lever 25 at a position rearward of the pivot shaft P. The lock lever 131 is normally urged to turn counterclockwise (FIG. 7) by a spring 175 acting between the lock lever 131 and the pivot shaft P. Counterclockwise movement of the lock lever 131 is limited when a hook portion 131a on a lower end of the lock lever 131 abuts against the locking portion 29b or when a portion of the lock lever 131 abuts against the guide 160a. The push rod 171 has a rear end pivotally attached to an end of the lock lever 131 remote from the hook portion 131a.

A switch 177 mounted on the bracket 160 can be closed by contact with a switch actuating finger 178 on the proximal portion 162 of the parking brake lever 25 for energizing a buzzer or lamp 179 (FIG. 3).

In operation, the parking brake lever 25 is pulled upwardly and rearwardly from the horizontal or lowermost position in which a stopper 193 on the proximal portion 162 engages the base plate 29 to an uppermost position, indicated by the solid lines in FIG. 7, in which a stopper 194 on the proximal portion 162 abuts against an upper end of the locking portion 29b. As the parking brake lever 25 is thus turned, the inner member 167 of the brake cable 133 is pulled, and the lock lever 131 is angularly moved counterclockwise under the tension of the spring 175 to cause the hook portion 131a to be locked by the locking portion 19b. Upon such turning movement of the lock lever 131, the push rod 171 pivotally connected to the end of the lock lever 131 is extended upwardly with respect to the tubular arm 169 until the push button 132 on the distal end of the push rod 171 projects out of the opening in the front end of the grip 170. At this time, a certain braking force is generated as described later on.

When the push button 132 is then pushed by a finger into the grip 170, the lock lever 131 is turned clockwise by the push rod 171 and unlocked from the locking portion 29b. The parking brake lever 25 is turned downwardly and forwardly under the resilient force of the spring 163, thereby returning the inner cable member 167 to eliminate the braking force.

Figure 8:
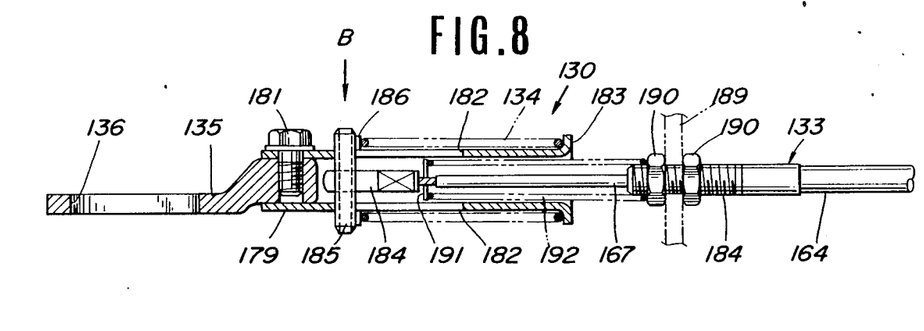
FIG. 8 is a cross-sectional view of an operating force limiting and transmitting unit.
Figure 9:
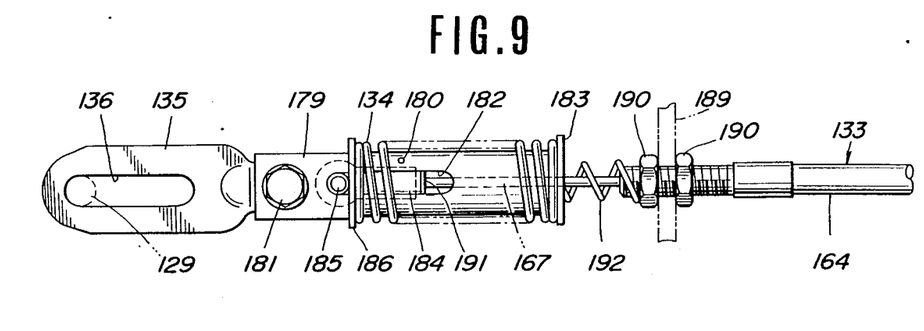
FIG. 9 is an elevational view of the operating force limiting and transmitting unit as seen in the direction of the arrow B in FIG. 8.

FIGS. 8 and 9 illustrate the operating force limiting and transmitting unit 130 in greater detail. The operating force limiting and transmitting unit 130 includes a tubular body 179 with its one end fixed to a joint 135 by a bolt 181. The pin 129 on the brake arm 126 of the braking mechanism 124 engages in an oblong hole 136 defined in the joint 135. The tubular body 127 has a pair of diametrically opposite oblong holes 182, 182, and includes a radially outward flange 183 on the other end thereof.

A shaft 184 fastened to the inner cable member 167 is inserted in the tubular body 179. A pin 185 is force-fitted in an end of the shaft 184 and has opposite ends projecting out of the oblong holes 182, 182, respectively. A washer 186 is held against the pin 185, and a spring 134 is disposed under compression between the washer 186 and the flange 183 of the tubular body 179. The tubular body 179 bears indicia 180 alongside of the oblong holes for indicating the limit of movement of the pin 185.

The outer cable member 164 has an externally threaded end 184 extending through a bracket 189 of the tractor frame and fastened thereto by nuts 190, 190. A washer 191 is mounted on the joint between the shaft 184 and the inner cable wire 167. A spring 192 is disposed under compression between the washer 191 and the nut 190 closer to the tubular body 179 for pulling the inner cable member 167 out of the outer cable member 164 for a prescribed length without allowing the inner cable member 167 to sag, when the parking brake lever 25 is turned downwardly to the horizontal inoperative position. In order to adjust accumulated errors of the components by extending or contracting the entire brake cable 133 longitudinally, the nuts 190, 190 are turned to change the position in which the outer cable member 164 is attached to the bracket 189. Since the tubular body 179 and the shaft 184 are interconnected through the pin 185 and the spring 134, the tubular body 179 and the shaft 184 will move axially in unison unless the inner cable member 167 is pulled under a force greater than the resilient force of the spring 134.

When the parking brake lever 25 is pulled angularly upwardly as shown in FIG. 7, the operating force required to operate the same is progressively increased as the parking brake lever 25 is turned through a greater angular interval. The operating force can be adjusted by adjusting the timing and stroke of operation of the operating force limiting and transmitting unit 130 at the time the parking brake is assembled. More specifically, the nuts 190, 190 are turned to adjust the brake cable 133 with respect to the unit 130 so that the resilient force of the spring 134 and the operating force for the parking brake lever 25 will be counterbalanced and hence the shaft 184 and the pin 185 will start moving with respect to the tubular body 179 when the parking brake lever 25 is in a position slightly spaced downwardly from its uppermost stroke limit, and the pin 185 in the oblong holes 182, 182 will stop at the indicia 180 when the parking brake lever 25 is in its uppermost stroke limit.

When the parking brake lever 25 is pulled angularly upwardly with the parts adjusted as described above, the tubular body 179 and the shaft 184 move in unison during an intial period of the angularly upward movement of the parking brake lever 25, producing a braking force dependent on the operating force acting on the parking brake lever 25. When the parking brake lever 25 is further pulled upwardly until the operating force required to pull the parking brake lever 25 exceeds the resilient force of the spring 134, the tubular body 179 is stopped while only the shaft 184 is moved through the adjusted interval until the parking brake elver 25 reaches its uppermost stroke limit. The operating force imposed on the braking mechanism 124 by the parking brake lever 25 at this time is absorbed as the spring 134 is compressed, and the produced braking force is limited to a force proportional to the reactive force of the compressed spring 134. The braking force is slightly greater than a force required for stopping the tractor on a slope lying at 20°, for example, but is relatively weak to allow the tractor to start smoothly with engine power while the parking brake is being in operation. The oblong hole 136 in the joint 135 serves to keep the parking brake lever 25 from moving when the brake pedal 23 is depressed.

Figure 10:
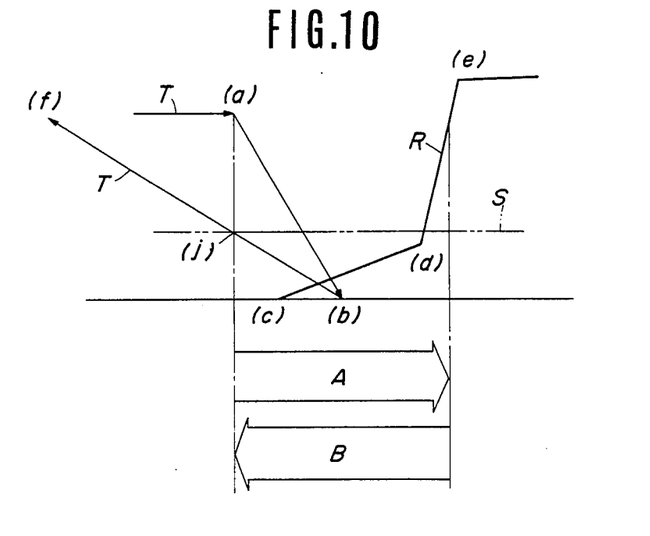
FIG. 10 is a diagram showing the relationship between an engine-produced drive force, a braking force produced by the depression of the pedal, and a braking force produced by the operation of the parking brake.

The braking force R imposed by the brake pedal 23 and engagement and disengagement of the clutch 36 will be described with reference to FIGS. 10 and 3.

When the brake pedal 23 is depressed in an interval A while the tractor is running, the clutch 56 starts being disengaged immediately but gradually at a point a through the clutch wire 76 connected at one end thereof to the arm 107 of the brake pedal 23. The clutch 56 is completely disengaged at b while the brake pedal 23 is in its depression stroke. Therefore, the drive force T from the engine is progressively reduced during an interval from a to b and falls to zero at b. At the time the brake pedal 23 starts being depressed, the front end 111a of the brake rod 111 is held against the front end of the slot 108 in the arm 107. Although the brake rod 111 is moved to the left (FIG. 3), no braking force R is produced at this time due to a play in the braking mechanism 124. When such a play is eliminated at c, a relatively weak braking force R starts to be generated. The spring 112 is now extended to cause the front end 111a of the brake rod 111 to slide in the slot 108. Therefore, the distance which the brake rod 111 moves is smaller than the angular interval which the brake pedal 23 is depressed. The brake arm 126 is turned gradually, and the weak braking force R is increased at a low rate. The point c at which the braking force R starts being produced is selected to precede the point b at which the clutch 56 is completely disengaged, so that the interval in which the clutch 56 is disengaged and the interval in which the brake is actuated are overlapped during a period between b and c.

When the brake pedal 23 is further depressed after the clutch 56 has completely been disengaged (b), the brake rod end 111a engages the rear end of the slot 108. Continued depression of the brake pedal 23 after the point d causes the brake rod 111 to move with the brake pedal 23, thus moving the brake arm 126 to a greater extent to produce a braking force R at which is large enough to bring the brake shoes 154 into contact with the brake drum 152 in the braking mechanism 124 under a sufficient force to stop the tractor.

The resilient force of the spring 118 of the turnbuckle 113 is selected to counterbalance the force with which the brake rod 111 is pulled at this time. When the brake pedal 23 is further depressed from the point e, the brake pedal 23 is turned into abutment against the lower-limit stopper 106, and the brake rod 111 is moved further to the left (FIG. 3). The applied force to pull the brake rod 111 and its stroke of movement are however taken up by as the spring 118 is compressed, so that any force in excess of the reactive force of the compressed spring 118 will not act on the braking mechanism 124.

When the parking brake lever 25 is lifted after the tractor has been stopped, the brake arm 126 is turned upwardly (FIG. 3) by the inner cable member 167 through the operating force limiting and transmitting unit 130 for braking the wheels. At this time, the slot 123 in the bell crank 22 prevents the brake pedal 23 from coacting with the parking brake lever 25. If the parking brake lever 25 is pulled under a stronger force than the resiliency of the spring 134 of the unit 130, the unit 130 is bodily compressed against the resilient force of the spring 134, failing to turn the brake arm 126. As a consequence, the braking force S imposed by the parking brake will not exceed a prescribed level. Therefore, if it is desired to start the tractor while the parking brake is active, the tractor can smoothly be started wit the engine drive power T which is greater than the prescribed level.

When the brake pedal 23 is released from the depressed condition in an interval B (FIG. 10), the components operate in a reversed process. The clutch 56 is engaged gradually by the damper 91 to increase engine drive power T progressively from b to f.

Operation and advantages of the device of the invention are as follows: When the running tractor is to be stopped, the brake pedal 23 is depressed to brake the tractor with the weak braking force R generated in the overlapping interval between c and b before the clutch 56 is completely disengaged. Therefore, the tractor is prevented from being abruptly braked by the depression of the brake pedal 23. At the initial period of the depression of the brake pedal 23, only the weak braking force R is generated and the pedaling of the brake pedal 23 is easy to perform. Where the tractor is to be braked suddenly, the brake pedal 23 should be depressed quickly to increase the braking force R sharply from d to e.

For starting the tractor, the driver's foot is removed from the brake pedal 23. The braking force R is sharply reduced from e to d, and then gradually reduced from d to c. The clutch 56 is engaged slowly from b due to operation of the damper 91. The tractor starts to move smoothly since the engine drive power T and the braking force R coexist in the overlapping interval between b and c.

When the tractor is to be started on an uphill road while the parking brake is in operation, the brake pedal 23 is released with the parking brake lever 25 pulled. The braking force R is reduced from e to c and the clutch 56 is slowly engaged from b due to operation of the damper 91. The tractor starts slowly moving from a point j where the engine drive force T overrides the parking braking force S. Then, the parking brake lever 25 is released. Therefore, the tractor can easily be started on the uphill road by any driver without the danger of moving back on the uphill road.

In the foregoing embodiment, the damper 91 is employed to engage the clutch 56 slowly. However, the damper 91 may be dispensed with, and the clutch 56 can be engaged slowly by releasing the brake pedal 23 gradually. The illustrated mechanism for initially generating the weak braking force R in response to depression of the brake pedal 23 may be dispensed with. With no such mechanism, the brake pedal 23 should be depressed slowly to increase the braking force gradually.

FIGS. 11 through 15 illustrate an interlocking control device for a brake and a clutch according to another embodiment of the present invention. While in the preceding embodiment the turnbuckle with the operating force limiting and transmitting mechanism is disposed in the brake system, the same turnbuckle is disposed in the clutch system according to the embodiment of FIGS. 11 through 15.

Figure 11:
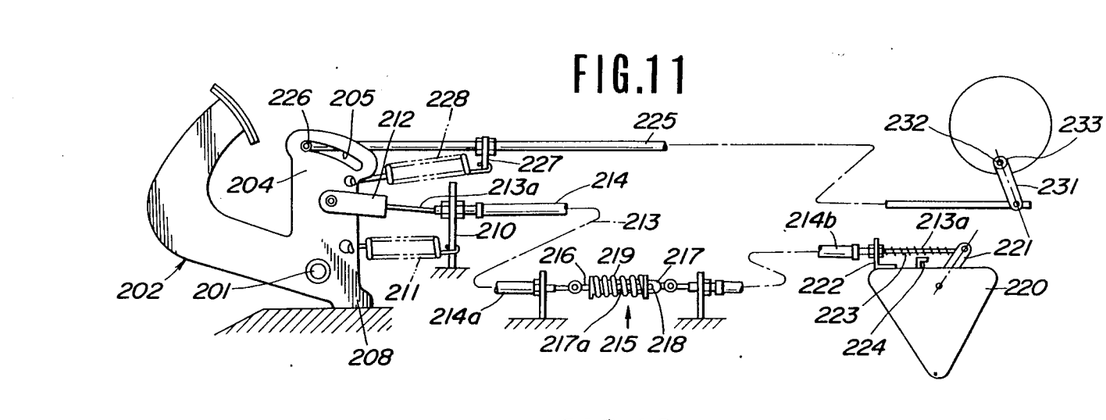
FIG. 11 is a fragmentary side elevational view of an interlinking control device for a brake and a clutch in accordance with another embodiment of the present invention.

In FIG. 11, a pedal 202 pivotally supported by a pivot shaft 201 on the tractor frame has an integral connector arm 204 operatively coupled to a clutch and a brake. The pedal 202 is normally urged to return clockwise to its undepressed position under the resilient force of a tension spring 211 connected between a lower portion of the connector arm 204 and a bracket 210 on the tractor frame. To an intermediate portion of the connector arm 204, there is joined through an arm 212 a clutch wire 213 extending through an outer member or sheath 214 fixed to the bracket 210.

The clutch wire 213 has an end coupled to a clutch release arm 221 which is normally urged to engage the clutch, as shown, under the force of a compression spring 223 acting between the clutch release arm 221 and a bracket 222 fixed to a clutch casing 220 in front of the clutch release arm 221. A stopper 224 for the clutch release arm 221 projects from the clutch casing 220 at a position between the clutch release arm 221 and the bracket 222, to which the outer member 214 is fixed.

The clutch wire 213 has on its intermediate portion a turnbuckle 215 comprising a rod 216 connected to a front wire member 213a sheathed by an outer member 214a and a tubular body 217 connected to a rear wire member 213b sheathed by an outer member 214b. The rod 216 is coupled to the tubular body 219 by a pin 218 extending through axially oblong holes 217a defined in the tubular body 217. A compression spring 217 is disposed between the pin 218 and a flanged end of the tubular body 217 closer to the rod 216 for normally urging the rod 216 to move into the tubular body 217. The spring force of the compression spring 217 is selected to be strong enough to keep the components of the turnbuckle 215 in the illustrated position until the clutch is disengaged.

The connector arm 204 of the pedal 202 has a slot 205 defined in an upper portion thereof and extending in a direction in which the pedal 202 is angularly movable. A brake rod 225 has a front bent end 226 loosely fitted in the slot 205 and a rear end coupled to a brake actuating arm 231 for the drive wheels. The brake actuating arm 231 has a pivot shaft 232 on which a torsion spring 233 is disposed for normally urging the brake actuating arm 231 to keep the brake inoperative as shown.

A bracket 227 is secured to a front portion of the brake rod 225. The brake rod 225 is normally urged in a forward direction, i.e., toward the pedal 202 to bring the bent rod end 226 in pressed contact with the front end of the slot 205 under the resilient force of a tension spring 228 connected between an upper portion of the connector arm 204 and the bracket 227. The spring force of the tension spring 228 is selected to be stronger than that of the torsion spring 233.

Figure 12:
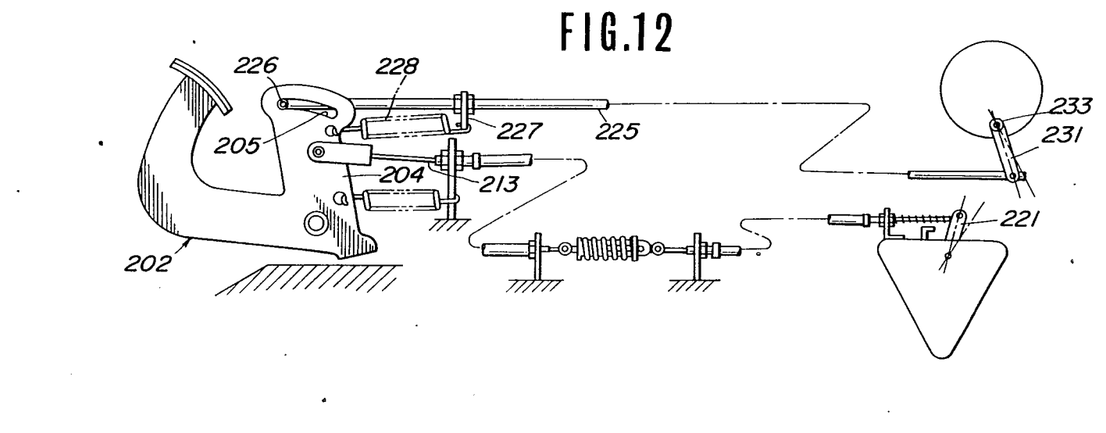
FIGS. 12 through 14 are views similar to FIG. 11, illustrating the successive positions which the device of FIG. 11 assumes as a pedal is progressively depressed.
Figure 13:
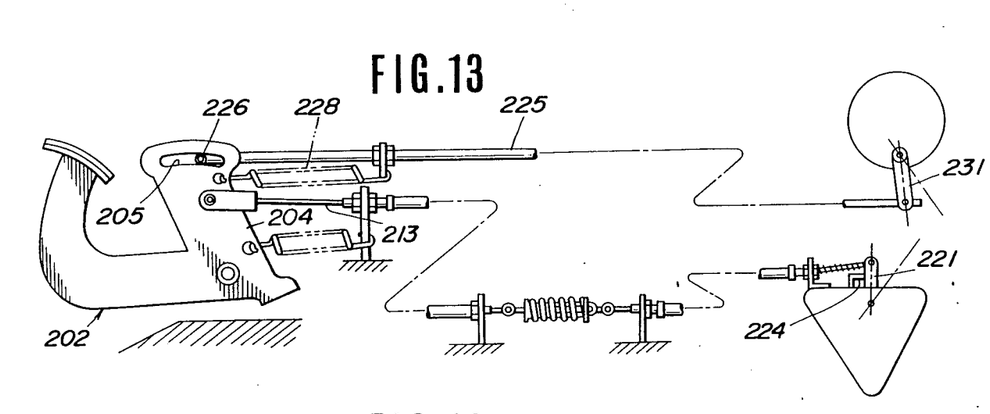
Figure 14:
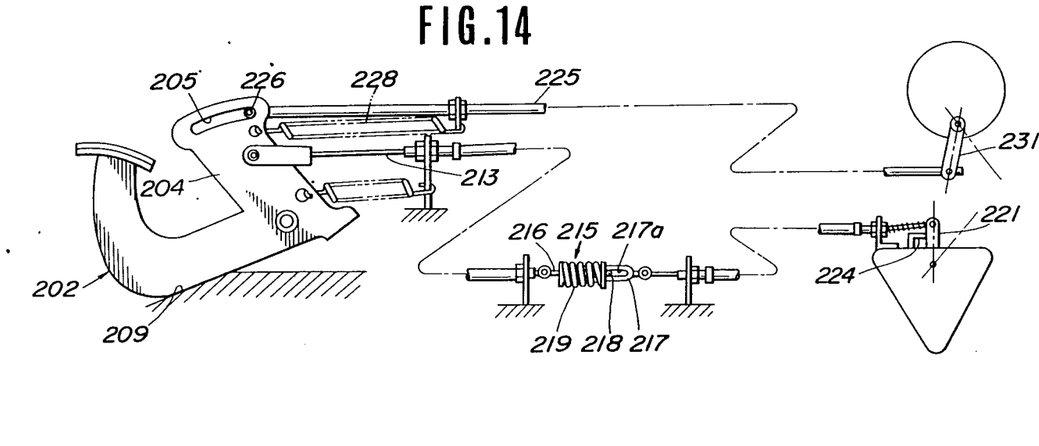
Figure 15:
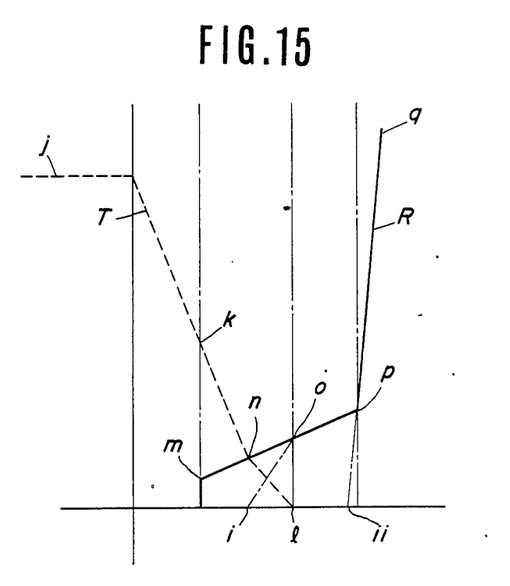
FIG. 15 is a diagram showing the relationship between an engine-produced force and a braking force.

Operation of the interlinking control device constructed as described above will be described with reference to FIGS. 11 through 15. FIGS. 12 through 14 show progressive positions of the device, and FIG. 15 illustrates the relationship between an engine drive power and a braking force at progressive levels of the pedal stroke.

When the pedal 202 is not depressed as shown in FIG. 11, the brake is not in operation and the clutch is engaged. The drive force transmitted by the clutch at this time is indicated by j in FIG. 15. The uppermost stroke limit of the pedal 202 is given by a stopper 208.

As the pedal 202 is depressed, the clutch wire 213 is pulled to turn the clutch release lever 221 in a forward direction, as shown in FIG. 12, starting to disengage the clutch. The brake rod 225 is pulled by the tension spring 228 to turn the brake actuating arm 231 in a forward direction. Since the brake has a play, it starts to produce a weak braking force from the condition of FIG. 12. The drive force transmitted at this time is indicated by k and the braking force R produced at this time is indicated by m as shown in FIG. 15.

When the pedal 202 is further depressed, the clutch release lever 221 is brought into contact with the stopper 224, as shown in FIG. 13, to disengage the clutch. The drive force transmitted at this time is nil as indicated by l in FIG. 15. In the pedal stroke from the position of FIG. 12 to the position of FIG. 13, the braking force R is gradually increased to the extent which counterbalances the drive force T as indicated by n in FIG. 15, whereupon the force imposed on the brake exceeds the spring force of the tension spring 228. The tension spring 228 then begins to extend longitudinally to allow the front bent end 226 of the brake rod 225 to be retracted relatively in the slot 205 in the pedal connector arm 204. The braking force R produced in the position of FIG. 13 is indicated by Q in FIG. 15.

Therefore, the braking force R smaller than the spring force of the tension spring 228 can be produced prior to complete disengagement of the clutch, and is progressively increased as shown by the straight line indicated by m, n and p.

Continued depression of the pedal 202 increases the weak braking force R while causing the front bent end 226 of the brake rod 225 to engage the rear end of the slot 205. From this time on, the pedal 202 and the rod 225 move in unison to pull the brake actuating lever 231 strongly for thereby starting to generate a normal strong braking force R, as indicated by p in FIG. 15. The pedal 202 is now depressed in its full stroke, whereupon the braking force R is produced as indicated by q in FIG. 15.

In the pedal stroke from the position of FIG. 13 to the position of FIG. 14, the compression spring 209 of the turnbuckle 215 in the clutch wire 213 is compressed under the operating force imposed from the pedal 202 to move the pin 218 forwardly in the oblong holes 217a. Therefore, the force tending to pull the clutch release lever 221 after the clutch has been disengaged is taken up by the turnbuckle 215, which therefore serves as a lost-motion mechanism. The full depression stroke of the pedal 202 is limited by a stopper 209 as illustrated in FIG. 14.

With the spring 228 for generating the weak braking force before the clutch is completely disengaged, the braking force is progressively increased as indicated by m, n, l, and p while the drive force is reduced from k to l. The tractor is braked at i when the pedal 202 is depressed to the stroke position in which the braking force and the drive force are counterbalanced at n. Thereafter, the braking effect on on the tractor is increased from Q to p and finally from p to q.

As a consequence, the braking effect on the tractor is relatively weak, gradually increasing from m through p to q in overlapping relation to the stroke of clutch disengagement, as compared with a conventional braking effect which rises sharply from ii to q. Therefore, the device of the invention is effective in preventing the tractor from being suddenly and quickly braked, while allowing a longer pedal stroke, to facilitate smooth braking operation.

When the tractor is to be started after the tractor has been stopped by the pedal brake, the clutch can be engaged while the tractor is being subjected to a weak braking force even if the pedal is released. Consequently, the tractor can be started smoothly without a sudden and quick start.

With the arrangement of the present invention, as described above, a tractor-mounted working machine having a single pedal for actuating a brake and engaging and disengaging a clutch can be stopped and started smoothly in a simple operation on either a flat road or a sloping road.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. An interlinking control device in a tractor-mounted working machine having an engine with a governor, wheels, a braking mechanism for braking the wheels, and a clutch for selectively transmitting power from the engine to the wheels, said interlinking control device comprising:
    (a) a first control system for operating said braking mechanism;
    (b) a second control system for operating said clutch;
    (c) a single manually operated swingable member coupled to ends of said first and second control systems, the arrangement being such that said clutch starts being disengaged when said swingable member starts swinging and is completely disengaged when said swingable member is positioned intermediately on a path of swinging movement thereof, and said braking mechinism produces a maximum braking force when said swingable member reaches a terminal end of said path of swinging movement thereof; and
    (d) a third control system for operating said braking mechanism to produce a braking force slightly greater than a force required to stop the tractor-mounted working machine on a sloping surface lying at 20° wherein said first and second control systems include first and second wire members respectively, said swingable member having an arcuate slot defined therein about a pivot thereof, the first wire member having an end engaging in said arcuate slot for movement therealong, including a resilient member connected between said swingable member and said first wire member for normally urging said first wire member toward said swingable member.

2. An interlinking control device according to claim 1, wherein said braking mechanism produces a braking force which gradually increases from a time prior to complete disengagement of said clutch, when said swingable member is positioned intermediately on said path, said braking force sharply increasing in the vicinity of said terminal end of said path.

3. An interlinking control device according to claim 1 wherein said braking mechanism includes an arm for starting to operate the braking mechanism, said first and second control systems having ends coupled to said arm.

4. An interlinking control device according to claim 1 further comprising a means for preventing said first control system from operating when said third control system operates said braking mechanism, said means including a drum brake, a turnbuckle, a first means for connecting said drum brake to said turnbuckle, a second means for connecting said turnbuckle to said first control system, an operating force limiting and transmitting means, a third means for connecting said operating force limiting and transmitting means to said third control system and a fourth means for connecting said operating force limiting and tansmitting means to said first means for connecting said drum brake to said turnbuckle.

* * * * *